No. 755,067. PATENTED MAR. 22, 1904.
W. R. SMITH.
POWER TRANSMITTING DEVICE.
APPLICATION FILED AUG. 10, 1903.
NO MODEL.
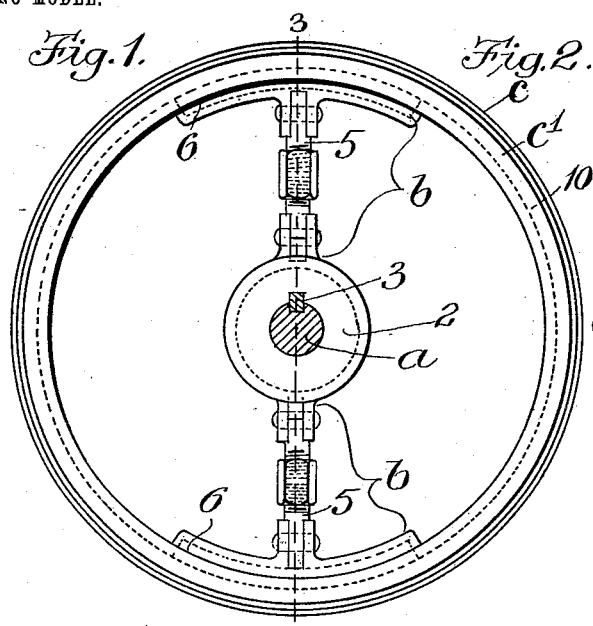
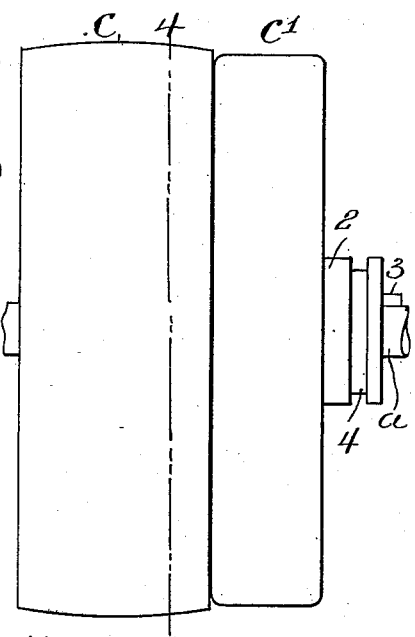
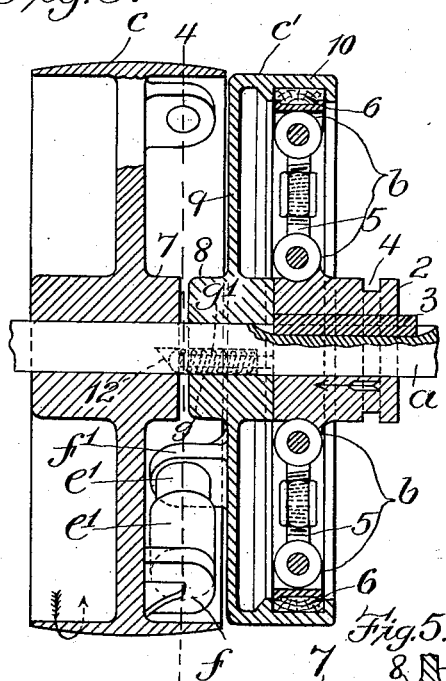
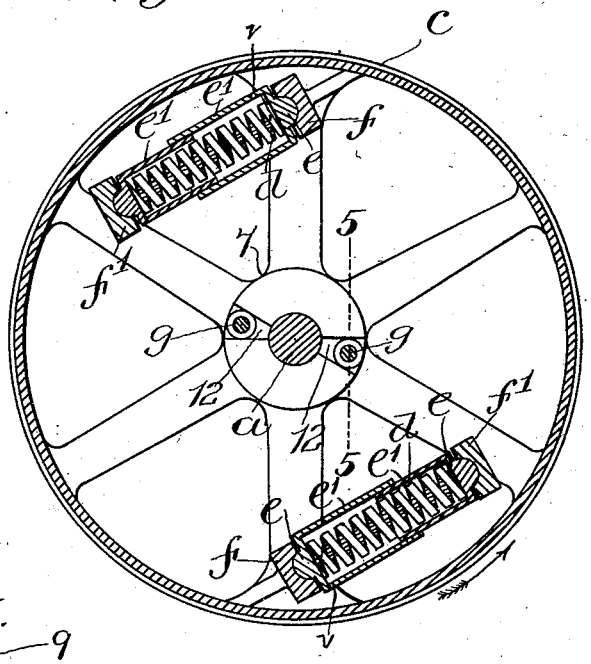
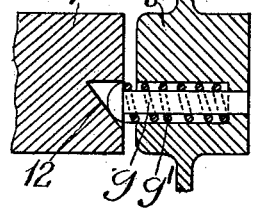
Witnesses:
H. Brown
E. Batchelder
Inventor.
W. R. Smith
by Knight Brown Quinby
attys No. 755,067. Patented March 22, 1904.

UNITED STATES PATENT OFFICE.

WILLIAM R. SMITH, OF BUFFALO, NEW YORK.

POWER-TRANSMITTING DEVICE.

SPECIFICATION forming part of Letters Patent No. 755,067, dated March 22, 1904.

Application filed August 10, 1903. Serial No. 168,851. (No model.)

*To all whom it may concern:*

Be it known that I, WILLIAM R. SMITH, of Buffalo, in the county of Erie and State of New York, have invented certain new and useful Improvements in Power-Transmitting Devices, of which the following is a specification.

This invention relates to power-transmitting mechanism comprising a driving member to which motion is imparted by a driver, such as a belt or a gear-wheel, a driven member, and a clutch, one part of which is connected with the driving member and the other part with the driven member, one clutch part being movable into and out of engagement with the other to connect and disconnect the said members.

The invention has for its object to enable the clutch parts to be automatically separated when an overload, such as might be caused by a sudden break in the mechanism or from any other cause, is imposed upon the clutch.

The invention also has for its object to enable the clutch to withstand a heavier load without the separation of its parts when the driven member is being started than it will withstand after the inertia of the driven member and the parts connected therewith has been overcome.

To these ends the invention consists in the improvements which I will now proceed to describe and claim.

Of the accompanying drawings, forming a part of this specification, Figure 1 represents an end view of a power-transmitting device embodying my invention. Fig. 2 represents a side view of the same. Fig. 3 represents a section on line 3 3 of Fig. 1. Fig. 4 represents a section on line 4 4 of Figs. 2 and 3. Fig. 5 represents a section on line 5 5 of Fig. 4.

The same reference characters indicate the same parts in all the figures.

In the drawings, $a$ represents the driven member, here shown as a shaft.

$b$ represents as a whole the clutch part, which is rotatively engaged with the driven member and is adjustable or movable by a suitable shipping device (not shown) into and out of engagement with the complemental clutch part on the driving member, hereinafter described.

The clutch parts above referred to may be of any suitable construction. In this embodiment of my invention the part $b$ comprises, first, a hub 2, which is adapted to slide lengthwise on the shaft $a$ and is rotatively engaged with the shaft by a spline 3, the said hub having a peripheral groove 4 to engage the shipping device; secondly, links or struts 5, pivoted at their inner ends to the hub 2, and, thirdly, clutch-shoes 6, pivoted to the outer ends of the links 5. The arrangement is such that an endwise movement of the hub 2 in the direction indicated by the arrow marked thereon in Fig. 3 will force the clutch-shoes outwardly into engagement with the complemental clutch part on the driving member hereinafter described, while a movement of said hub in the opposite direction will separate the clutch-shoes from said complemental part.

The driving member is composed of two parts or sections $c$ $c'$, which are rotatable independently of the driven member when the said clutch parts are disconnected, the said sections being in this embodiment of my invention mounted to rotate loosely on the shaft $b$. The section $c$, which I term the "primary" section, is adapted to engage a suitable driver and is here shown as a pulley, the rim of which is formed to engage a driving-belt, while its hub portion 7 encircles the shaft $a$. The section $c'$, which I term the "secondary" section, as here shown, comprises a hub portion 8, encircling the shaft $a$, a web 9, projecting outwardly from the hub 8, and an annular flange 10, projecting from one side of the web, said flange constituting a clutch part, of which the inner face of the flange is the acting surface. The flange 10 surrounds the clutch part $b$ of the driven member and is adapted to be engaged by the clutch-shoes 6 when the latter are pressed outwardly. The sections $c$ and $c'$ are not rigidly connected, each being capable of a limited independent rotary movement. Motion is communicated from the primary section $c$ to the secondary section $c'$ through compression-springs $d$ $d$, the ends of which bear on heads $e$ $e$, which are seated on ears or abutments $f$ $f'$, formed on the section $c$ and on the section $c'$, the said heads $e$ being preferably affixed to tubes e' e', one having a close practically air-tight sliding fit within the other, said tubes and heads forming telescopic air-chambers, the object of which will be explained hereinafter.

g g represent push-pins, which are adapted to slide in guides in the hub 8 of the secondary section c'. Said pins have heads, which are pressed outwardly by springs g' against the hub 7 of the primary section c. Said hub has faces 12 12, which are inclined or oblique to the shaft a and are so arranged that under certain conditions hereinafter described they will engage the heads of the push-pins and force the latter against the hub 2 of the movable clutch part b, thus moving said hub in the direction required to force the clutch-shoes 6 out of engagement with the clutch part 10 on the secondary section c' and stopping the rotation of the shaft. The relative arrangement of the inclined faces 12 and the push-pins g is such that the heads of the pins come in contact with the inclined faces when the springs d have been compressed to a predetermined extent or, in other words, when the springs are sustaining their maximum predetermined load. An increase in the load on the springs will therefore cause a further compression of the springs and allow the secondary section c' to be sufficiently retarded to cause the inclined faces 12 to move the push-pins g with the result above described. It will be seen, therefore, that an overload on the springs will immediately cause a separation of the clutch parts, thus avoiding damage from such overload.

The object of the telescopic air-chambers containing the springs d is to prevent the springs from yielding to the point required to cause the separation of the clutch parts when the inertia of the driven member and the parts connected therewith is being overcome or, in other words, when the driven member is being started. At this time more than the predetermined load which the springs are designed to support is liable to be imposed on the clutch. The telescopic air-chambers confine bodies of air which form air-cushions, retarding the compression of the springs until sufficient time has been afforded to overcome the inertia of the driven member, the air-cushion transmitting motion from the primary section to the secondary section and causing the springs to receive their load gradually. The air-cushions are gradually removed by leakage of air from the telescopic chambers, which may be provided with one or more small vents v for this purpose.

It is obvious that the driving member may be rotated by power applied to it through gears instead of through a driving-belt.

Having thus explained the nature of my invention and described a way of constructing and using the same, although without having attempted to set forth all the forms in which it may be embodied or all the modes of its use, I declare that what I claim is—

1. A power-transmitting device comprising a driven member having an adjustable clutch part mounted to slide on the shaft and rotatively engaged therewith, a driving member composed of a primary section and a secondary section, the primary section being formed to engage a driver, while the secondary section is provided with a clutch part adapted to engage the clutch part on the driven member, means for yieldingly transmitting power from the primary section to the secondary section, whereby the motion of the secondary section and of the driven member engaged therewith may be retarded by an increased load, and means actuated by such retardation for moving the adjustable clutch part to disconnect the driving member from the driven member.

2. A power-transmitting device comprising a shaft, an adjustable clutch part mounted to slide on the shaft and rotatively engaged therewith, a primary driving-section loosely mounted on the shaft, a secondary driving-section loosely mounted on the shaft beside the primary section and having a clutch part adapted to engage the clutch part on the shaft, yielding connections between the said sections permitting the motion of the secondary section and of the shaft engaged therewith to be retarded by an increased load, and means actuated by such retardation for moving the adjustable clutch part to disconnect the driving member from the driven member.

3. A power-transmitting device comprising a shaft, a clutch part mounted to slide on the shaft and rotatively engaged therewith, a secondary driving-section mounted loosely on the shaft and having a clutch part adapted to engage the said sliding clutch part, push-pins movable in said secondary section to displace the sliding clutch part, said push-pins being normally held out of engagement with said clutch part, a primary driving-section loosely mounted on the shaft, and power-transmitting springs connecting the two sections, the primary section being provided with means for moving the push-pins against the sliding clutch part when the springs have received a predetermined load.

4. A power-transmitting device comprising a driven member having an adjustable clutch part, a driving member composed of a primary section and a secondary section, the latter having a clutch part formed to engage the said adjustable clutch part, a compression-spring interposed between bearings or abutments on said sections and adapted to yieldingly transmit motion from the primary to the secondary section, means operated by a predetermined compression of the spring for separating the clutch parts, and means for retarding the compression of the spring when the inertia of the driven member is being overcome.

5. A power-transmitting device comprising a driven member having an adjustable clutch part, a driving member composed of a primary section and a secondary section, the latter having a clutch part formed to engage the said adjustable clutch part, a yielding connection between the two sections composed of, first, a telescopic air-chamber, one part of which is engaged with the primary section and the other with the secondary section, and secondly, a compression-spring, said connection permitting the movement of the secondary section and of the shaft engaged therewith to be retarded, and means operated by the retardation of the secondary section for separating the clutch parts.

In testimony whereof I have affixed my signature in presence of two witnesses.

WILLIAM R. SMITH.

Witnesses:
 THOS. H. NOONAN,
 J. E. VOORHIS.